Oct. 31, 1961 R. B. SNELL 3,006,464
PRESSURE-SENSITIVE ADHESIVE TAPE ROLL
Filed Oct. 2, 1958
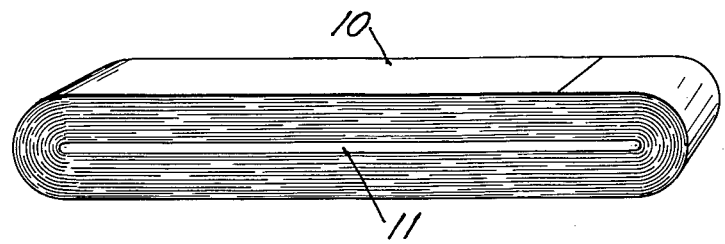
INVENTOR.
ROBERT B. SNELL
BY
Carpenter, Abbott, Coulter & Kinney
ATTORNEYS

United States Patent Office 3,006,464
Patented Oct. 31, 1961

3,006,464
PRESSURE-SENSITIVE ADHESIVE TAPE ROLL
Robert B. Snell, White Bear Township, Ramsey County, Minn., assignor to Minnesota Mining and Manufacturing Company, St. Paul, Minn., a corporation of Delaware
Filed Oct. 2, 1958, Ser. No. 764,833
2 Claims. (Cl. 206—59)

This invention relates to a novel compact shuttle-like roll of a long length of pressure-sensitive adhesive tape wound upon itself. It is conveniently produced by completely flattening a cylindrical roll of tape and uniting the opposing central planar surfaces. The elongated flat-sided product roll has the shape of a rectangular parallelepiped with hemi-cylindrical ends; the length being several times the thickness, hence the shuttle-like character.

Pressure-sensitive adhesive tapes have a backing coated with an aggressively tacky adhesive which in its normal dry form readily adheres to dissimilar surfaces upon mere contact or light finger-pressing of the tape. The adhesive has a rubbery base and is stretchy and highly cohesive so that the tape can be unwound from a roll and handled with the fingers without offsetting of adhesive. These tapes are conventionally sold in the form of a roll of tape wound upon itself on a circularly-cylindrical core, tacky side in.

My invention provides a conveniently manipulatable pressure-sensitive adhesive tape roll which resembles a shuttle and which is adapted to be passed as a shuttle through restricted openings (e.g., around harnesses on switchboards, between closely spaced wires, etc.) while at the same time paying out tape (e.g., as in winding the tape about a wire), and carrying a conveniently handled supply length of tape therethrough. A long length of tape can thus be made available in a compact handy form, lengths of 5 to 100 yards (or 5 to 100 meters) being provided in the product as sold.

My pressure-sensitive tape article is much smaller, more compact and easier to handle in restricted access locations than conventional tape articles comprised of an equal length of tape wound on a cylindrical core.

Telescoping, that is lateral displacement of the turns of tape on a cylindrical core, presents a serious problem in cylindrical tape constructions, particularly where stretchy tapes are employed. The amount of displacement increases outwardly from the cylindrical core so that a funnel-like or telescoping effect is produced. Surprisingly, I have found that the particular structure of my tape article essentially obviates the problem of telescoping even in the case of stretchy adhesive tapes (e.g., plastic vinyl tapes) wound tightly in overlapping convolutions.

The length of conveniently handled tape wound on a cylindrical core is necessarily quite limited where the resulting article must be of such small size as to pass through, for example, a one inch square opening. Cylindrical tape articles smaller than one inch in diameter would be unwieldy and too minute for convenient handling. They could not carry any commercially significant long supply length of tape for splicing operations. It is sometimes necessary, however, particularly in electrical applications, to wind long lengths of tape about one or more wires in fixed close relationship, where clearance is something under one inch. My invention provides an article which meets such requirements as to quantity of tape and compact easily-handled article size.

The compact nature of my article permits savings in the space requirements for packing, shipping and storing it in large quantities.

The article hereof will be further described in connection with the accompanying illustrative drawing wherein a side perspective view of the article is diagrammatically illustrated.

As indicated in the drawing, the shuttle-like flattened roll has a length several times the thickness. The edge-over-edge windings of the long length of pressure-sensitive adhesive tape 10 are flat and parallel except at the ends where the tape makes semi-circular turns. This geometric shape results from having completely flattened the original cylindrical roll of tape from which the product is formed. The thickness of the compacted flattened roll is thus approximately twice the thickness of the tape winding of the original cylindrical roll, and its length is greater than the outside diameter of the original roll. The length of each convolution is the same as in the original roll.

The opposing central planar surfaces of the tape are adhesive bonded to a separator strip 11 having the same width as the tape, and are thereby united. This strip is preferably a flexible non-fibrous film, such as a strip of cellulose acetate film, to which the contacting pressure-sensitive adhesive surfaces of the tape adhere with sufficient strength to prevent any tendency of the roll to spring open. Upon unwinding of the tape the inner end portion can be readily removed from the separator strip in condition for use. This separator strip can be omitted and reliance placed on direct face-to-face adhesive bonding of the opposed faces of the innermost convolution of tape, but with the disadvantage that the inner end portion of the tape cannot be utilized. Since the separator strip is flexible, it can be flexed and inserted into position prior to completion of the flattening operation. In either case, the shuttle-like roll can be flexed or bent to aid in passing it through restricted spaces.

The following closely approximate formula shows the relationship of the length and thickness of the flattened roll to the radial dimensions of the original cylindrical roll from which formed:

$$\frac{L}{T} = \frac{\pi d}{4t} + 1$$

where "L" is the length of the flattened roll, "T" is the thickness thereof, "$d$" is the inner diameter of the cylindrical roll, and "$t$" is the thickness of the winding of tape in the cylindrical roll.

For example, a cylindrical roll of tape having an inner diameter of 2 inches and a tape winding thickness of ½ inch, when fully flattened with its opposed planar interior surfaces unite, provides a shuttle-like tape article according to this invention having a ratio of length to thickness of 4.14. The thickness of the article is approximately 1 inch and its length is approximately 4.14 inches.

As a specific illustration of the structure of my article and a method for making the same, the following is offered: The cardboard paper core was removed from a production-line conventional cylindrical roll of pressure-sensitive adhesive coated plastic tape (e.g., a roll of plastic tape such as taught in Oace et al. Patent No. Re. 23,843), having an internal diameter of about 1¾ inches and an external diameter of about 2¼ inches, carrying 20 yards of tape. The circular roll of tape was then placed in a press so that the press plates were perpendicular to the diameter of the roll. Pressure was applied until the roll assumed a fully flattened shape with its innermost opposed adhesive faces of tape pressed into adhesive contact with each other in planar face-to-face relationship. Changing of the cylindrical roll to a fully flattened shape, as here discussed, did not result in any noticeable distortion of the windings (wrinkling or stretching). The geometry is such that at all stages of transition from the cylindrical shape to the fully flattened state, each convolution of tape maintains essentially the same circumferential length.

After the article was fully flattened, pressure was removed and the fully flattened roll was found to stably retain its shape. It was laid on a shelf for a period of three months, after which it was re-examined and still found to retain its flattened shape without telescoping or other change.

This tape article had a length of about 3⅜ inches and a thickness of about ½ inch. It carried 20 yards of tape. In practical tests, it was found easy to manipulate, as a shuttle, between closely spaced wires while wrapping one of the wires with a continuous sheath of tape.

Several fully flattened rolls of tape formed as illustrated, using the tape material described in the aforenoted Oace et al. patent, were put in two different air circulating ovens, one at 120° F. and the other at 150° F. for a period of 7 days. After 7 days aging at these temperatures, all of the flattened articles were noted to retain their shuttle-like, fully-flattened shape, without telescoping or other significant change in geometry.

In these examples, no separator strip was incorporated, illustrating satisfactory use of the simplest manufacturing procedure. Rolls made with use of a separator strip are substantially identical in dimensions and have the advantage previously mentioned of conserving all of the tape in condition for use.

Fully flattened rolls of tape formed of well-known rubber-resin type pressure-sensitive adhesives coated on glass cloth backings, polyethylene terephthalate backings, as well as a variety of other backings have, in all cases, exhibited the properties aforedescribed for the tape articles of this invention.

Double-coated pressure-sensitive adhesive tape having a removable liner serving as a temporary backing may also be supplied in flattened rolls in accordance with this invention.

I claim:

1. An article consisting of a shuttle-like fully-flattened roll of a long length of pressure-sensitive adhesive tape having a backing coated with a rubber-resin type pressure-sensitive adhesive, said tape being wound in overlapping relationship upon itself, with each of the overlaps of said tape adherent to underlying layers thereof, and with the flattened opposing central planar surfaces of said tape adhesively united to opposite sides of a flat separator strip located therebetween, said shuttle-like fully flattened roll being free of telescoping.

2. An article consisting of a shuttle-like fully-flattened roll of a long length of pressure-sensitive adhesive tape having a backing coated with a rubber-resin type pressure-sensitive adhesive, said tape being wound in overlapping relationship upon itself, with each of overlaps of said tape adherent to underlying layers thereof, and with the flattened opposing central surfaces of said tape in adhesive contact with each other and in planar face-to-face relationship, said compact shuttle-like fully-flattened roll of pressure-sensitive tape being free of telescoping.

References Cited in the file of this patent

UNITED STATES PATENTS

| 733,282 | Scott | July 7, 1903 |
| 972,668 | Wheeler | Oct. 11, 1910 |
| 1,005,787 | Sibley | Oct. 10, 1911 |
| 1,895,758 | Goldsmith | Jan. 31, 1933 |
| 1,908,982 | Howard | May 16, 1933 |
| 2,084,878 | Van Cleef | June 22, 1937 |

FOREIGN PATENTS

| 851,797 | Germany | Oct. 9, 1952 |